Figure 1:
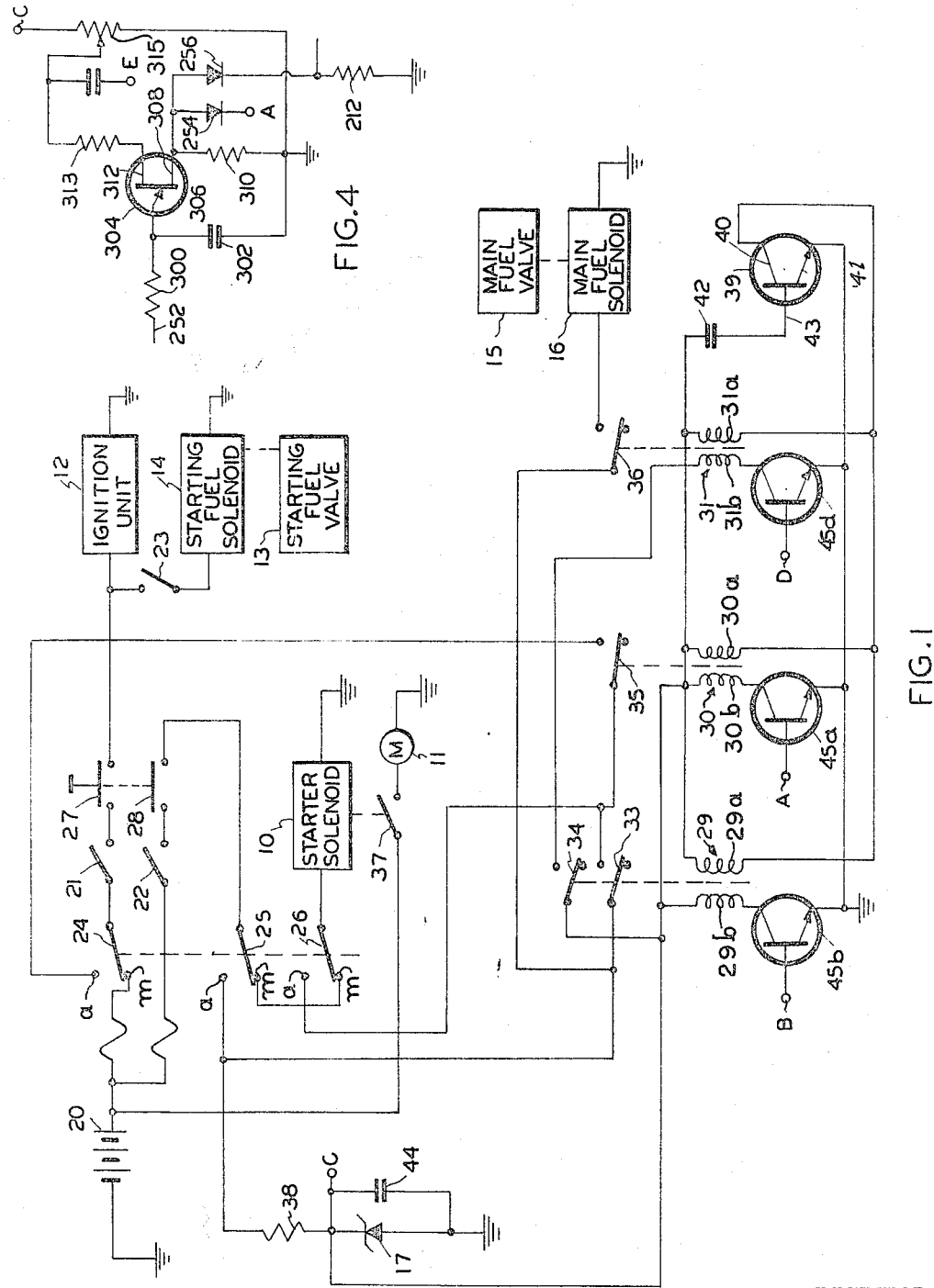

United States Patent Office 3,310,937
Patented Mar. 28, 1967

3,310,937
AUTOMATIC STARTING CONTROL SYSTEM
FOR GAS TURBINE ENGINES
Emile G. Smith, Bridgeport, Conn., assignor to Avco Corporation, Stratford, Conn., a corporation of Delaware
Filed Aug. 20, 1965, Ser. No. 481,373
21 Claims. (Cl. 60—39.14)

This invention relates to a system for automatically controlling the starting accessories of an internal combustion Brayton cycle-type engine, and more particularly to a system for automatically controlling the starting accessories of a gas turbine engine during either a normal starting cycle or during an abnormal starting cycle resulting in a starting attempt abort.

In starting an aircraft gas turbine engine it is necessary to manipulate at least four engine accessories. In the usual system the aircraft pilot must open the main fuel valve to permit the flow of fuel up to the engine fuel combustor; turn on the engine starter motor; open the starting fuel valve for admitting starting or priming fuel into the combustor; and initiate spark plug firing by means of an ignition exciter unit. The starter motor serves to "crank over" the engine, thus driving the compressor and associated fuel pumps. Starting primer fuel enters the combustor where it is ignited by the electrical spark generated across the spark plugs, thus providing a propagating flame for the ignition of the main fuel. After ignition of the main fuel takes place and the compressor has been driven to a self-sustaining speed by the compressor turbine, the ignition unit must be de-energized, the starting fuel valve closed, and the starter motor turned off. Normally, each of these functions is controlled by the aircraft pilot who, with the aid of indicators, manually controls the various units in a pre-established sequence.

During a starting cycle there are several reasons why an attempted start should be aborted. Among these are excessive engine gas temperatures, a sub-standard voltage condition of the battery for operating the starting motor and other electrical accessories (for use in aircraft equipped with electrical starter motors), and an excessive lapse of time during an attempted start. When these, or any other abnormal conditions exist, the aircraft pilot manually aborts the start attempt by closing the various fuel valves and by de-energizing the starter motor and ignition exciter unit in a prescribed sequence. All of these procedures are complex and subject to pilot error. This invention seeks to overcome the deficiencies of the prior art by providing an automatic, electronic starting system for aircraft gas turbine engines wherein all engine accessories are under automatic control during a successful or an aborted engine start attempt. These results are achieved by sensing engine parameters and controlling the various accessories in response to the particular levels thereof. The system also provides means for automatically changing, in response to ambient temperature levels, the levels at which the accessories are controlled. In addition, means are provided for overriding the automatic control system and for permitting manual operation of the engine starting accessories as performed previously. The input signals applied to the various electronic control circuits comprise: (1) the output of a tachometer generator mechanically coupled to the compressor; (2) the output of a thermopile harness positioned to measure engine gas temperature; (3) the voltage level at the Zener diode regulated line; and (4) the output of an R.C. network used to indicate the elapsed time of an attempted start. In the event any one of these signals crosses over a predetermined level, output signal pulses are developed in a predetermined sequence to control the various accessories, for either a normal or an abnormal start.

It is a broad object of this invention to automatically control the starting accessories of an internal combustion gas turbine engine by means of electronic circuitry activated by a pilot-operated switch.

Another object of this invention is to provide an automatic engine starting system in which the engine accessories are controlled in a predetermined sequence in response to specified engine parameter limits.

Another object of this invention is to provide electrical signals proportional to selected engine parameters and to control the starting procedures of the engine automatically in response to any one of the signals achieving a predetermined level.

Still another object of this invention is to generate an electrical signal having a level proportional to the speed of rotation of the compressor of a gas turbine engine when the engine is being started and to automatically turn off the engine starting accessories in response to a predetermined level of said signals.

Still another object of this invention is to generate a signal for each of certain critical engine parameters during the starting of the engine, and to automatically abort the starting of the engine in response to a given level of any one signal, the accessories for starting said engine being turned off in a given sequence.

Another object of this invention is to provide an automatic control system for electronically controlling the starting procedures for a gas turbine engine, said engine having engine starting accessories including a starting or primer fuel valve for admitting starting fuel to the combustion chamber, an ignition system for igniting the starting fuel in the combustion chamber, a main fuel valve for preventing main fuel flow to the combustion chamber of the engine on the occasion of a start abort, and a starter motor for rotating the engine compressor and for driving a fuel pump, said control system including means for generating a control signal in response to each of a plurality of engine parameters, and means in response to any one of said control signals attaining a respective preselected level for automatically controlling selected ones of said engine accessories in a preselected sequence.

Still another object of this invention is to provide a control system for an engine as described above in which control signals are generated in response to one or more of the following engine parameters: Engine compressor speed, engine gas temperature, elapsed time of an attempted start and battery voltage, and wherein said ignition system is turned off, said starting fuel valve is closed and said starter motor is turned off in response to a predetermined compressor speed, and wherein, in response to a given level of any one of the remaining parameters, the ignition system is turned off, the starter fuel valve is closed, the main fuel valve is closed, and the starter motor is turned off, all in accordance with a pre-established sequence.

Another object of this invention is to provide novel electronic circuitry for performing the above-described functions.

Figure 2:
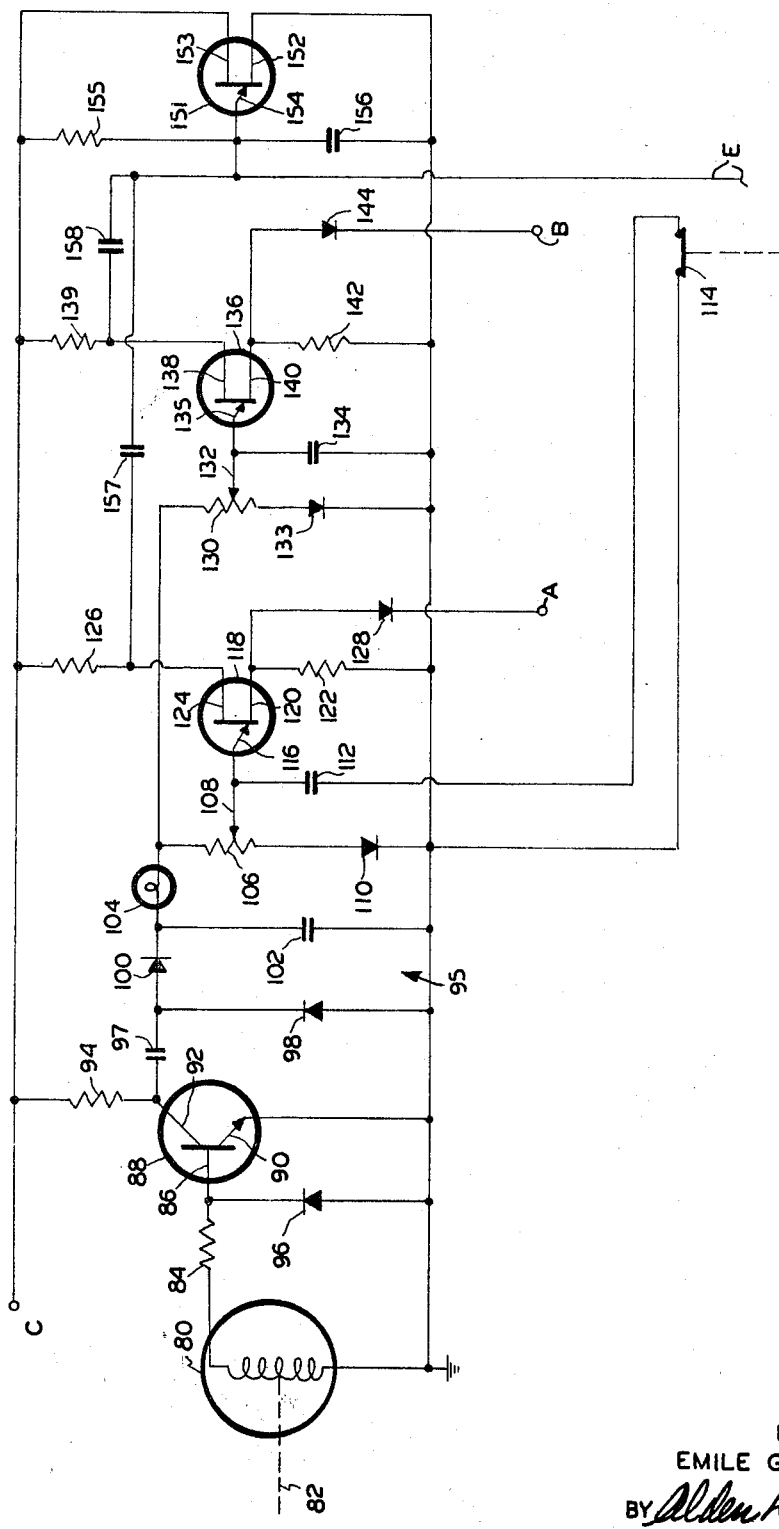
Figure 3:
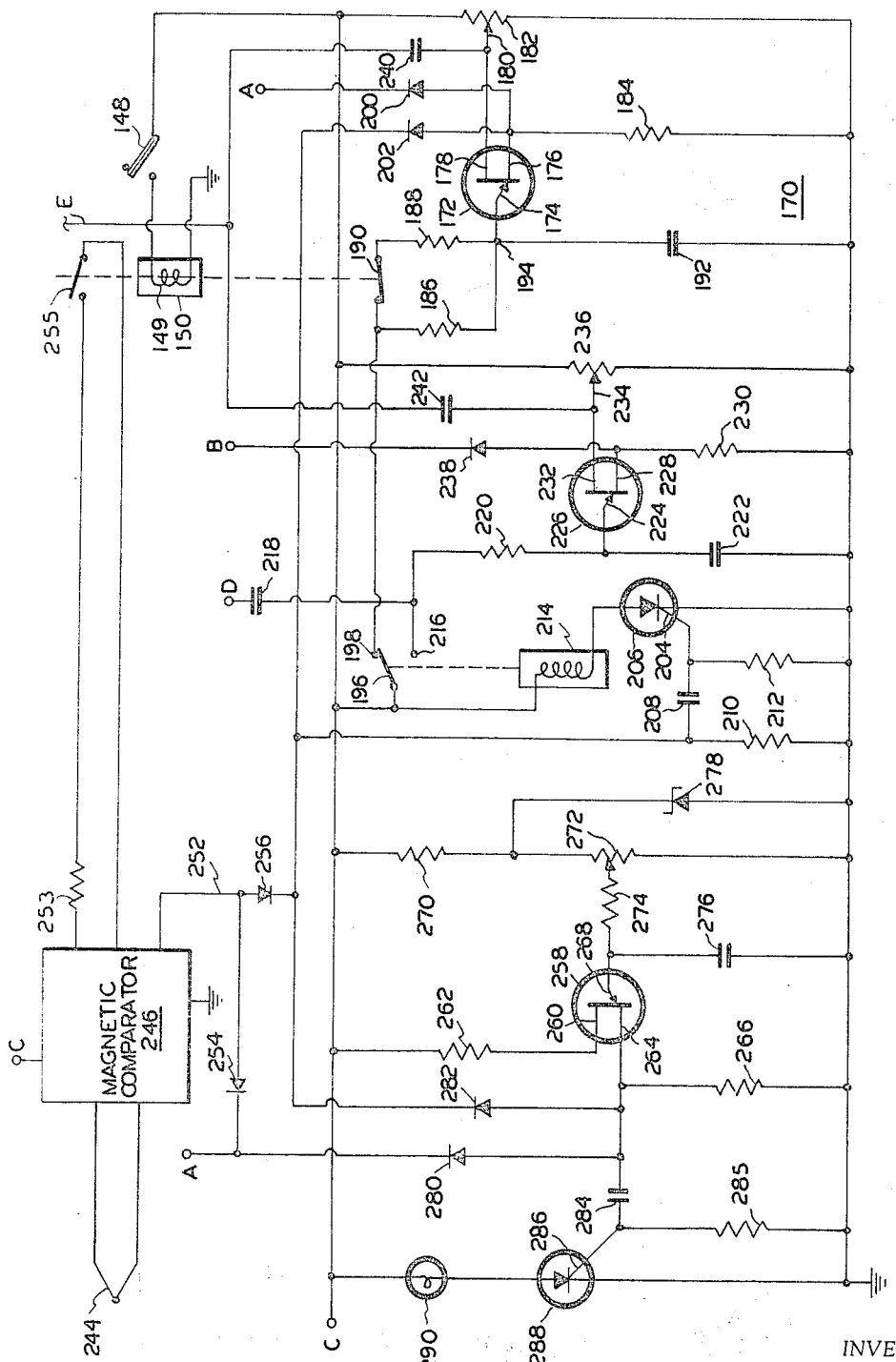

For further objects and advantages of this invention, reference should now be made to the following detailed specification and to the accompanying drawings in which:

FIGURES 1, 2, and 3 taken together illustrate an electronic starting system partly in schematic and partly in block diagram form, it being understood that terminals designated with the same reference characters A, B, C, D, or E are interconnected; and FIGURE 4 is a modification of one feature of the invention.

Referring first to FIGURE 1 of the drawings, the system includes four accessories: (1) a starter solenoid 10, when energized, serves to control a starting motor 11 for "motoring over" the engine compressor and various other mechanically coupled accessories and controls (not shown); (2) an ignition exciter unit 12, when energized, supplies electrical current in a proper form for igniting starting or primer fuel; (3) a starting or primer fuel solenoid 14, when energized, serves to open a starting fuel valve 13 to permit the flow of starting fuel into the combustion chamber (not shown) where a propagating flame is produced; and (4) a main fuel solenoid 16, when energized, serves to close a main fuel valve 15 to prevent the flow of main fuel into the combustion chamber. In addition, the system includes a zener diode 17 which provides a regulated voltage for the operation of the electronic control circuits.

The various accessories are powered by means of a battery 20. A system of manual and relay-operated switches serves to connect the battery 20 to each of the various accessories. The switches are arranged so that the starting procedures may, at the pilot's option, be automatically carried out or so that they may be carried out under the control of the pilot.

For an attempted start, the pilot manually closes three switches: an ignition switch 21; a starter switch 22; and a starting fuel switch 23. In addition, the pilot chooses automatic or manual operation by throwing the mechanically coupled switches 24, 25, and 26 into an "automatic" position $a$ or into a "manual" position $m$. In the "manual" position, as shown, the system operates under the control of the pilot. In the "automatic" position, the starting procedures are accomplished automatically. In either event the attempted start is initiated by the pilot depressing mechanically coupled "start" switches 27 and 28.

With the switches 24, 25, and 26 in the "manual" position, as shown, and with the switches 21, 22, and 23 closed, the closing of the "start" switches 27 and 28 establishes a connection from the battery 20 to the starter solenoid 10 through switches 22, 28, 25, and 26; to the starting fuel solenoid 14 through the switches 24, 21, 27, and 23; and to the ignition unit 12 through the switches 24, 21, and 27. Thus, each of the accessories 10, 12, and 14 are energized in an engine starting mode. The main fuel valve is in an engine operating mode when de-energized. The pilot will maintain the switches 27 and 28 depressed until such time as the engine has started or until he desires to abort.

For an automatic start, the switches 24, 25, and 26 are thrown to the "automatic" position $a$. The energization circuit to the various accessories is then completed through the contacts of three latching-type relays: a starter relay 29, an ignition relay 30, and a main fuel relay 31, each having oppositely acting windings 29a, 29b 30a, 30b, 31a and 31b, respectively. The switches of each of the relays, shown in their initial positions, include: switches 33 and 34 mechanically coupled to relay 29; switch 35 mechanically coupled to relay 30; and switch 36 mechanically coupled to relay 31. To start the engine, the positions of these relay-operated switches are reversed. When switches 33 and 34 of relay 29 and switch 35 of relay 30 are closed, the following circuit connections to the accessories are made. First, a connection is made from the battery 20 to the starter solenoid 10 through the switches 22 and 28, the switch 25 is in the $a$ position, switch 33, and switch 26 in the $a$ position. Energization of the starter solenoid 10 closes a switch 37 to energize the motor 11. Second, a connection is made from the battery 20 to the ignition exciter unit 12 through the switches 22 and 28, the switch 25 in the $a$ position, switch 33 of the relay 29, switch 35 of the relay 30, switch 24 in the $a$ position, the switch 21, and the switch 27. Energization of the unit 12 produces ignition sparks. Third, a similar connection is made to the starting fuel solenoid 14 through the switch 23 to open the starting fuel valve. Fourth, a connection to the main fuel solenoid 16 from the battery 20 through switches 22, 28, and 25 in the $a$ position and switch 36 is broken, to de-energize the main fuel solenoid 16 and open the main fuel valve 15.

When windings 29a and 30a are energized, their associated switches are latched into a closed position, while energization of the windings 31a latches the switch 36 or relay 31 into an open position. The energization circuit for the windings of relays 29, 30, and 31 is from the battery through the switches 22, 28, and 25 in the $a$ position to a resistor 38 in series with the zener diode 17. The voltage at terminal C, at the junction of resistor 38 and the zener diode 17, constitutes a regulated supply for these windings as well as for the entire electronic control system. A transistor 39 has its collector 40 connected to the terminal C through the relay windings 29a, 30a, and 31a which are connected in parallel, while its emitter 41 is connected to ground. A capacitor 42 is connected between the transistor base 43 and terminal C for establishing an operating base pulse on "turn on." Capacitor 44 is connected across the zener diode 17. Thus, with the various manual switches closed, and with the switches 24, 25, and 26 in the automatic position, a regulated voltage is established at the terminal C when the pilot depresses the start switches 27 and 28. When the transistor 39 conducts on "turn on" current then flows through each of the windings 29a, 30a, and 31a to latch the switches 33, 34, and 35 in the closed position, and the switch 36 in the open position.

In response to a successful start, it is necessary to de-energize the starter solenoid 10, the starting fuel solenoid 14, and the ignition unit 12. This is accomplished by energizing the oppositely acting windings 29b and 30b to latch the associated switches into an open position. In the event of an unsuccessful start, it is also necessary to energize the main fuel solenoid 16. This is done by energizing the oppositely acting winding 31b to latch the switch 36 into a closed position. To selectively energize these windings, the collector and emitter electrodes of transistors 45B, 45A, and 45D are connected in series with the windings 29b, 30b, and 31b, respectively. Collector-emitter bias for each of these transistors is provided from the terminal C. These transistors are, however, non-conductive until an appropriate voltage is supplied to their respective bases at the terminals B, A, and D.

Appropriate pulses are derived from the electronic control circuits to be described. A pulse, or pulse train, applied to the terminal A renders the transistor 45A conductive, thereby energizing the winding 30b of relay 30 and opening the associated switch 35. This serves to de-energize the ignition unit 12 and the starting fuel solenoid 14. A pulse applied to the terminal B renders the transistor 45B conductive, thereby energizing the winding 29b of relay 29 and opening the associated switches 33 and 34, thereby de-energizing the starter solenoid 10. A pulse applied to the terminal D renders the transistor 45D conductive and thereby energizing the winding 31b of relay 31 to latch the switch 36 closed and energize the main fuel solenoid.

When there has been a failure to obtain fuel ignition or ignition propagation within a specified period of time, it is necessary to interrupt the operation of all starting accessories, as well as main fuel flow, in order to abort the start attempt. For this purpose the electronic control circuitry develops a similar pulse train which is applied to the terminals A and B as before, and in addition to the terminal D, causing the switch 36 to latch into its closed position.

There are many possible conditions indicating an unsuccessful attempt to start. This system aborts an engine start on the occurrence of any one of the following: (1) When the engine gas temperature exceeds a pre-established limit; (2) when the engine fails to reach a self-sustaining speed within a predetermined elapsed period of time; and (3) when there is a below tolerable voltage level condition at the battery 20.

As previously noted, the regulated voltage supply at the terminal C provides the operating supply for all of the electronic control circuits. If the engine start attempt is aborted for any of the above conditions, pulses are produced within the control circuitry at specific points to trigger in sequence the following events: (1) at terminal A for energizing the ignition relay winding 30b to turn off the ignition unit 12 and de-energize the starting fuel solenoid 14; (2) at terminal D for energizing the main fuel relay winding 31b to close the main fuel solenoid operated valves; and thereafter (3) at the terminal B to energize the starter relay winding 29b to de-energize the starter solenoid 10. As a result of this sequence, the starter motor continues to drive the compressor after the fuel valves have been closed and the ignition turned off. This results in an automatic purging of fuel from the combustion chamber in preparation for a subsequent attempted start. The control circuits for performing each of these functions, as well as those functions associated with a successful start, will now be described with reference to FIGURES 2 and 3.

In a normally successful start, the only control voltage affecting operation is in response to engine compressor speed. This control voltage is developed in response to the frequency component of the output of a tachometer generator 80 mechanically coupled to the shaft 82 of the engine compressor. It serves to turn off the ignition exciter unit 12 and engine starter motor 11 and to close the starting fuel solenoid operated valve 13 after the compressor has reached a certain speed.

The voltage developed across the windings of tachometer generator 80 is applied through a resistor 84 to the base 86 of a transistor 88, its emitter 90 being connected to ground, and its collector 92 being connected to the regulated voltage supply at terminal C through a load resistor 94. A diode 96 connected between the base 86 and the emitter 90 serves to limit the negative voltage swing so as to prevent base 86 to emitter 90 breakdown due to excessive negative voltage reverse bias. The transistor 88 serves to convert the positive portion of the input pulses into constant amplitude square wave pulses having a repetition rate equal to the frequency of the tachometer generator 80. The output from transistor 88 is applied to a network 95 including a capacitor 97 and a diode 98 connected between the collector 92 and ground, a diode 100 connected to the junction of capacitor 97 and diode 98, and a capacitor 102. The voltage developed across the capacitor 102 is a function of the discrete increments of energy coupled into it by capacitor 97 and is applied through a temperature-compensating resistor, illustrated as a filament lamp 104, and across a resistor 106 having a movable tap 108 and a diode 110.

A charge storing capacitor 112 is connected between the movable tap 108 and ground through a normally closed relay-operated switch 114. The voltage level developed across the capacitor 112 is applied to the emitter electrode 116 of a unijunction transistor 118, its base one electrode 120 being connected to ground through a resistor 122 and its base two electrode 124 being connected to the regulated voltage at terminal C through a resistor 126. Trigger pulses are emitted by transistor 118 when the voltage level built up on capacitor 112 exceeds the critical level established by the values of the resistors 122 and 126 and the peak point voltage of the particular unijunction transistor in use. This level is matched to that D.C. level across capacitor 102 corresponding to the given frequency point such that trigger pulse emission is determined by the position of the movable tap 108 on resistor 106. The unijunction transistor 118 acts as a threshold operating multivibrator and conducts current pulses from the terminal C through the resistor 126, the unijunction transistor 118, as well as from capacitor 112 and the top portion of resistor 106, through resistor 122. The major portion of the pulse developed across resistor 122 is then passed through diode 128 to the terminal A. Terminal A is connected to the base of transistor 45A, described in connection with FIGURE 1, and the voltage developed serves to energize the ignition relay winding 30b.

The D.C. voltage level developed on the capacitor 102 through lamp 104 is also applied across a resistor 130 having a movable tap 132 and a diode 133, a storage capacitor 134 being connected between the movable tap and ground. The voltage developed at the movable tap 132 is applied to the emitter electrode 135 of a unijunction transistor 136 having a base two electrode 138 connected to the regulated supply at terminal C through a resistor 139 and base one electrode 140 connected to ground through a resistor 142. Trigger pulses will be emitted by transistor 136 when the voltage level of the capacitor 134 exceeds a predetermined limit as established by the value of resistors 139 and 142 and the peak point voltage of the particular unijunction transistor in use. This level is matched to that D.C. level across capacitor 134 corresponding to the given frequency point such that trigger pulse emission is determined by the position of the movable tap 132. The unijunction transistor 136 acts as a threshold operating multivibrator and conducts current pulses from the terminal C through resistor 139, the transistor 136, as well as the capacitor 134 and the top portion of resistor 130 through resistor 142. The major portion of the pulse developed across resistor 142 is then passed through diode 144 to the terminal B. This current flow serves to energize the relay winding 29b described in connection with FIGURE 1.

Ordinarily the control current pulses developed by the unijunction transistor 118 will precede the control current pulses developed by the unijunction transistor 136 so that the ignition unit 12 is de-energized and the starting fuel solenoid operated valve 13 is closed prior to the de-energizing of the starter solenoid 10. However, the unijunction transistor 118 may be made inoperative by the disconnection of the capacitor 112 from ground by the switch 114. Such disconnection will occur upon the automatic closing of a thermal switch 148 (see FIGURE 3) which connects terminal C to the windings 149 of a relay 150. The thermal switch 148 is closed when the ambient temperature drops below a predetermined level, and this, in effect, maintains the ignition unit 12 and the starting fuel solenoid operated valve 13 open until the unijunction transistor 136 conducts to insure better starting operation in cold weather.

The control circuit also includes a unijunction transistor 151 having its base one and base two electrodes 152 and 153 connected across the regulated voltage terminal C and ground, and its emitter 154 connected to the junction of a resistor 155 and a capacitor 156. The unijunction transistor 151 is designed to operate as a free running multivibrator as long as there is voltage at terminal C. The function of transistor 151 is to generate negative going sampling pulses at the emitter terminal 154. These negative sampling pulses are then applied through capacitors 157 and 158 to the base two electrodes 124 and 138 of unijunction transistors 118 and 136, respectively. This serves to reduce the respective base two to base one voltage drop momentarily, at which time the unijunction transistor involved can conduct fully if its emitter voltage has reached the preset trip point. This is done because the effective resistances placed in series with each of the emitter electrodes and their current source is so large as to otherwise prevent stable firing of the respective unijunction transistors.

The foregoing circuitry controlled by the frequency portion of the output of the tachometer generator 80 serves to turn off the engine ignition, close the starting fuel valve, and interrupt the starter motor after the engine has been successfully started. However, if excessive engine gas temperatures are detected, or if the engine fails to ignite or accelerate to a given speed after a given period of time, or if an undervoltage condition of the battery 20 occurs, the attempted start should be absorbed so that possibly dangerous conditions may be corrected. The following portion of the circuit shown in FIGURE 3 performs these functions automatically.

The control circuit for aborting an attempted start after an excessive lapse of time from the closing of the starting switches 27 and 28 (FIGURE 1) comprises a timing network generally indicated at 170 and includes a unijunction transistor 172 having an emitter electrode 174, a base one electrode 176, and a base two electrode 178. The electrode 178 is connected to the terminal C through the movable tap 180 of a resistor 182 connected between the terminal C and ground. The electrode 176 is connected to ground through a resistor 184. The bias for the emitter electrode 174 is established by means of an R.C. network including a capacitor 192 and resistors 186 and 188 connected in parallel by means of a contact 190 operated by relay 150, the emitter electrode 174 being connected to the junction 194. The resistance capacitance network is connected to terminal C through the singlepole, double-throw, relay-operated switch 196 which initially completes a connection through a contact 198. When the terminal C is supplied with power by the pilot's closing of the starting switches 27 and 28, current flows from the terminal C through the resistors 186 and 188 to charge the capacitor 192 at a rate determined by the resistance and capacitance values of the R.C. network. When the capacitor 192 is charged from zero volts to a voltage sufficient to trigger the unijunction transistor 172, current pulses then flow from terminal C through the tap of resistor 182, the electrode 178 and 176, and through a diode 200 connected to the terminal A. It is noted that if the thermal switch 148 is closed due to a decrease in ambient temperature, the contact 190 is opened by the relay 150 and only the resistor 186 is in the charging circuit.

This increases the effective resistance and hence the time required for charging the capacitor 192, and allows for a longer attempted start time. When the ambient temperature is above 30° F., the attempted start time is approximately 40 seconds, while under 30° F., the attempted start time is approximately 90 seconds. In either case, the engine ignition unit 12 and starting fuel solenoid 14 are turned off after the expiration of the lapse of time established by the circuit time constants.

Current flowing through the electrodes 178 and 176 of the unijunction transistor 172 also flows through a diode 202, and these currents are applied to a control electrode 204 of a diode switch 206 through a coupling network including a capacitor 208 and resistors 210 and 212. The anode and cathode of the diode switch 206 are in turn connected across the regulated supply through the windings of a relay 214, the armature of which is coupled to the relay-operated switch 196. Thus, when the unijunction transistor 172 conducts, the diode switch 206 is thereafter rendered conductive and current flows through the windings of relay 214 to move the switch 196 to a second contact 216 connecting terminal C to terminal D through a coupling capacitor 218. This energizes the relay winding 31b of the main fuel relay 31, thus closing the switch 36 and energizing the main fuel solenoid 16. This cuts off all flow of fuel to the engine. At this point, the engine ignition has been turned off and the starting and main fuel solenoid operated valves are closed, leaving only the engine starter motor 11 still in operation.

When the relay 214 is energized, current also flows from the terminal C through the switch 196 and contact 216 to a resistance capacitance charging network comprised of resistor 220 and capacitor 222, the junction of which is connected to the emitter electrode 224 of a unijunction transistor 226, its base one electrode 228 being connected to ground through a resistor 230 and its base two electrode 232 being connected to the terminal C through the movable tap 234 of a resistor 236. When the charge on capacitor 222 exceeds the peak point voltage level of unijunction transistor 226, the unijunction transistor 226 is switched into an oscillating state and current pulses then flow from the terminal C through resistor 236, tap 234, base two electrode 232, base one electrode 228, and a diode 238 to the terminal B, which in turn is connected to the starter relay winding 46 for de-energizing the starter solenoid and turning off the starter motor.

It will also be noted that the emitter electrode 154 of unijunction transistor 151 (see FIGURE 2) is also coupled to the base two electrode 178 of unijunction transistor 172 and the base two electrode 232 of unijunction transistor 226 through capacitors 240 and 252, respectively. When the emitter voltage of either of the unijunction transistors 172 and 226 reach their peak point voltage level, the sampling pulses from transistor 151 cause them to conduct reliably in spite of their low emitter current levels.

Thus, if the engine fails to start after a predetermined time, the unijunction transistor 172 conducts, serving to shut off the ignition exciter unit 10 and the starting and main fuel valves 13 and 15, and thereafter initiating the timing cycle of unijunction transistor 226 to turn off the starter motor 11. This sequence is particularly advantageous since the continued operation of the starter after the closing of the main fuel solenoid operated valves, serves to purge out the combustion chamber of any accumulated fuel "flooding" the engine.

The temperature of the engine gases is sensed by an appropriately positioned thermopile harness 244, the output from which is connected to a direct current operated magnetic comparator 246. The magnetic comparator 246 is supplied operating current by connection to the terminal C, and when the thermopile voltage developed therein exceeds a preset level, voltage pulses developed within the comparator are fed into the system at line 252. The level required for developing an output at line 252 is changeable by means of a resistor 253 which is connected into the circuit by means of a relay-operated switch 255 closed by relay 150 in response to a low ambient temperature.

The voltage pulse output from the magnetic comparator 246 is applied through diode 254 to terminal A to energize the ignition relay 30. It is also applied through a diode 256 and the capacitor 208 to the control electrode 204 of diode switch 206, causing diode switch 206 to conduct and energizing the windings of relay 214.

At this point the cycle described in connection with the time control circuit is repeated, the main fuel valve being turned off by the connection of the terminal C to the terminal D through the switch 196, and the unijunction transistor 226 emitting current pulses after the capacitor 222 is sufficiently charged to subsequently turn off the starter motor 11.

Under some circumstances it is preferable to abort a start attempt after the engine exhaust gases have been at a given level for a predetermined time rather than waiting until the temperature exceeds a still higher level. FIGURE 4 represents a modification suitable for this purpose. To connect the modification shown in FIGURE 4, the line 252 in FIGURE 3 is broken and the output from the magnetic comparator 246 is then connected to ground through a resistance capacitance charging network comprising a resistor 300 and a capacitor 302. When a voltage is developed from the output of the magnetic comparator 246, a charge begins to build up on the capacitor 302 at a rate depending on the time constant of the network. A unijunction transistor 304 has its emitting electrode 306 connected to the junction of resistor 309 and capacitor 302. Its base one electrode 308 is connected to ground through a resistor 310, while its base two electrode 312 is connected to the regulated supply at the terminal C through a resistor 313 and potentiometer 315. When the charge built up on capacitor 302 exceeds a predetermined level, the unijunction transistor 304 conducts and, as before, currents are supplied through the diode 254 to the terminal A and through the diode 256 to the resistor 212. Also, as before, the base two electrode is connected to the terminal E through a capacitor 314 and the resistor 313. With this arrangement, therefore, the starting attempt is not aborted immediately upon reaching a predetermined level but is aborted after the exhaust gas temperatures have exceeded that level for a period of time determined by the time constant of the resistance capacitance network 300, 302.

An under-voltage condition of the battery 20 also aborts an attempted start. In an embodiment of the invention reduced to practice, 12 volts was employed at terminal C, and hence the zener diode 17 was a 12-volt zener. If at any time the voltage of battery 20 falls to such an extent that the required 12 volts cannot be maintained at the terminal C, the system aborts an attempted automatic start. For this purpose, the system includes a unijunction transistor 258 having its base two electrode 260 connected to the terminal C through a resistor 262 and its base one electrode 264 connected to ground through a resistor 266. The emitter electrode 268 is connected to ground by means of a capacitor 276 and is connected through a resistor 274 to a point on a resistor 272 in a resistive string including resistor 270. A zener diode 278, connected between ground and the junction of resistors 270 and 272, serves to clamp the bias level. In practice, zener diode 278 was a 9-volt zener. Initially the transistor 258 is biased off by the voltage drop from the emitter junction of transistor 258 to ground, which opposes the voltage across capacitor 276 from the resistive string.

If the voltage between the terminal C and ground drops below 12 volts, to say 11 volts, the zener diode 278 is still able to maintain 9 volts, and the unijunction transistor 218 goes into oscillation by reason of the fact that the bias voltage from the base two electrode 260 to base one electrode 264, as established by the now below 12-volt supply, can no longer bias the transistor off, so that current flows through several paths.

One path is through a diode 280 to the terminal A to turn off the ignition exciter unit 12 and to close the starting fuel valve 14. The second path is through a diode 282 to the diode switch 206, whereupon the same cycle as previously described is again repeated, that is, relay 214 is energized to connect terminal C to terminal D to turn off the main fuel valve, and to connect terminal C to the charging capacitor 222 which ultimately causes conduction of pulses through unijunction transistor 226 to terminal B to turn off the starter motor 11. The third path is through a capacitor 284 and a resistor 285, the junction of which is connected to the control electrode 286 of a diode switch 288, the anode and cathode of which are connected in series with an indicator lamp 290 between terminal C and ground. The indicator lamp is located in the pilot's cockpit and when the diode switch 288 conducts, the pilot is provided with a visual indication of the under-voltage condition.

In summary, by simply holding the starting switches 27 and 28 closed, the entire engine start attempt may be either manually or automatically controlled. The closing of switches 27 and 28, when the switches 24, 25, and 26 are in the automatic position, causes the appropriate energization of the ignition exciter, the starting fuel solenoid valve and the starter motor as well as the connection of the zener diode 17 across the control circuits. Where the start is successful, the output from the tachometer generator 80 serves to trigger one or more electronic switches to interrupt the battery circuit; (1) to turn off the ignition exciter and close the starting fuel valve and (2) to subsequently turn off the starting motor. Where any malfunction is detected, output voltages are developed for (1) turning off the ignition exciter and closing the starting fuel valve, (2) closing the main fuel valve, and (3) turning off the starter motor, in the named sequence. In addition, the relay 150 serves, when energized by the closing of the thermal switch 148, to change the trip point level of the parameters in the electronic circuits in order to permit (1) higher compressor speeds prior to turn off of the ignition exciter and starting fuel solenoid, (2) a longer starting elapsed time, (3) and higher engine gas temperature limits before starting attempt abortion when the ambient temperature falls below a predetermined value.

While the detection of four conditions is disclosed, the system may include the detection of a greater or lesser number of conditions as circumstances warrant. For example, it may be advisable to detect compressor pressures and abort a start in response to a particular level, or it may be permissible to function without responding, for example, to an under-voltage or an excessive exhaust gas temperature condition.

While the particular circuit parameters form no part of this invention, the following parameters used in a system as actually reduced to practice are listed for purposes of enabling persons skilled in the art to reproduce this invention:

Resistors:
| | | |
|---|---|---|
| 38 | ohms | 20 |
| 84 | do | 6.8K |
| 94 | do | 4.7K |
| 106 | do | 100K |
| 122 | do | 240 |
| 126 | do | 470 |
| 130 | do | 100K |
| 139 | do | 470 |
| 142 | do | 240 |
| 155 | do | 150K |
| 182 | do | 2K |
| 184 | do | 470 |
| 186 | megohms | 6.67 |
| 188 | do | 1.47 |
| 210 | ohm | 1K |
| 212 | do | 1K |
| 220 | megohm | 1 |
| 230 | ohm | 470 |
| 236 | do | 2K |
| 253 | do | 330K |
| 262 | do | 470 |
| 266 | do | 220 |
| 270 | do | 180 |
| 272 | do | 2K |
| 274 | do | 47K |

Transistors:
| | Type |
|---|---|
| 39 | 2N697 |
| 45A | 2N697 |
| 45B | 2N697 |
| 45D | 2N697 |
| 88 | 2N696 |
| 118 | 2N1671B |
| 136 | 2N1671B |
| 151 | 2N1671B |
| 172 | 2N1671B |
| 226 | 2N1671B |
| 258 | 2N1671B |
| All diodes | 1N461 |

Zener diodes
| | |
|---|---|
| 17 | 1N3312 |
| 278 | 1N3019A |

Capacitors: μf.
| | |
|---|---|
| 42 | 15 |
| 44 | 35 |
| 97 | 1 |
| 102 | 15 |
| 112 | 1 |
| 134 | 1 |
| 156 | .33 |
| 157 | .47 |

Capacitors: μf.
| | |
|---|---|
| 158 | .47 |
| 192 | 21 |
| 208 | 1 |
| 218 | 2 |
| 222 | 21 |
| 240 | .47 |
| 242 | .47 |
| 276 | 6.8 |
| Diode switch 206 | Type 2N1595 |
| Magnetic comparator 246 | Magsense Model A-85 |
| All lamps | Type W-327 |
| Battery 20 | volts__ 28 |

It is apparent that many modifications and adaptations of the control circuitry will be available to persons skilled in the art. It is intended therefore that this invention be limited only by the scope of the appended claims as read in the light of the art.

What is claimed is:

1. In a system for automatically controlling the starting of a gas turbine engine, said system having a plurality of accessories including a starter solenoid for controlling the energization of a starter motor for rotating the compressor shaft of the engine, a starting fuel solenoid actuated valve for controlling the flow of fuel into a combustion chamber, an ignition system for igniting said fuel in said combustion chamber, and a main fuel solenoid actuated valve for controlling the flow of fuel into said combustion chamber, a source of energization for said accessories, each of said accessories being in an initial energization state wherein said starter motor and ignition unit are de-energized and said valves are closed, the combination comprising:

switch means for selectively establishing connections between said source and said accessories whereby the state of energization of each of said accessories may be selectively changed;

first means controlling said switch means for establishing connections between said source and said accessories to change the energization state of each of said accessories to a second state, whereby said starter motor and ignition unit are energized and said valves are open;

means responsive to a first engine parameter for generating a first control voltage;

second means controlling said switch means, said second means being responsive to said first control voltage above a predetermined level, said level representing a successful start of said engine, for changing the energization states of said starting fuel solenoid, said ignition unit, and said starter solenoid to their respective initial energization states, means responsive to a second engine parameter for generating a second control voltage;

third means controlling said switch means, said third means being responsive to said second control voltage above a predetermined level, said level representing an abnormal engine condition, for changing the energization state of said starting fuel solenoid, said main fuel solenoid, and said ignition unit to their respective initial energization states;

said third means including additional means, operative after a predetermined delay period following the change of energization state of said main fuel solenoid, for controlling said switch means to change the energization state of said starter solenoid to its initial state, whereby an attempted start is aborted.

2. The invention as defined in claim 1, and means responsive to a given ambient temperature for automatically increasing said predetermined levels of said first and second control voltages.

3. The invention as defined in claim 1 wherein said second means responsive to said first control voltage includes delay means for changing the energization state of said starter solenoid to said initial state after the changing of the ignition unit and starting fuel solenoid to their initial energization states.

4. The invention as defined in claim 1 wherein said first control voltage is generated by means of a tachometer generator coupled to said compression shaft, said tachometer generator developing an output voltage having a frequency proportional to the speed of said shaft; and wherein said second means comprises:

(a) means for converting said output voltage to a constant amplitude square wave having a width proportional to frequency;

(b) a regulated source of direct voltage;

(c) first and second electronic switches connected across said regulated source, each of said electronic switches being biased non-conductive in the absence of applied voltages below predetermined levels;

(d) a first resistance-capacitance charging network;

(e) means coupling said square wave to said first resistance-capacitance charging network, the voltage charge developed across said first resistance-capacitance network being applied to said first electronic switch, said first electronic switch being rendered conductive when the charge across said first resistance-capacitance charging network exceeds one predetermined level;

(f) a second resistance-capacitance charging network;

(g) means coupling said square wave to said second resistance-capacitance charging network, the voltage charge developed across said second resistance-capacitance network being applied to said second electronic switch, said second electronic switch being rendered conductive when the charge across said second resistance-capacitance network exceeds a second predetermined level; and wherein said switch means is controlled by conduction of said first electronic switch to change the energization state of said ignition unit and said starting fuel solenoid to their respective initial energization states; and wherein said switch means is controlled by conduction of said second electronic switch to change said starter solenoid, said ignition unit, and said starting fuel solenoid to their respective initial energization states.

5. The invention as defined in claim 4, and means in response to a given ambient temperature for disabling said first resistance-capacitance network.

6. The invention as defined in claim 5 wherein said first and second electronic switches are unijunction transistors, each having base one and base two electrodes connected across said source, and an emitting electrode biased by a respective resistance-capacitance charging network.

7. The invention as defined in claim 5 wherein said means for disabling said first resistance-capacitance charging network includes a temperature responsive switch for disconnecting the capacitance from said network.

8. The invention as defined in claim 1 wherein said means responsive to a second engine parameter for generating a second control voltage is a thermopile, the voltage developed by said thermopile being proportional to the temperature of said engine, said means responsive to said control voltage above a predetermined level including:

a source of regulated voltage;

a magnetic switch connected across said source of regulated voltage, said magnetic switch being normally biased for non-conduction in the absence of an applied voltage above said predetermined level, said second control voltage being applied to said magnetic switch, and wherein said switch means is controlled in response to conduction of said magnetic switch to change the energization state of said ignition unit and said starting fuel solenoid to its initial energization state;

A first electronic switch;

the windings of a relay and said first electronic switch connected in series across said source, said first electronic switch being biased for non-conduction in the absence of an applied voltage above said predetermined level, said relay being operatively coupled to a single pole, double-throw switch for selectively connecting a contact to said source, said single pole, double-throw switch initially being out of engagement with said contact, said second control voltage being applied to said electronic switch, conduction of said first electronic switch, when said second control voltage exceeds said level, energizing said relay to move said switch into engagement with said contact, said switch means being controlled in response thereto for changing the energization state of said main fuel solenoid;

a resistance-capacitance charging network connected across said source through said contact and said single pole, double-throw switch; and a second electronic switch connected across said source, said electronic switch being normally biased for non-conduction in the absence of an applied voltage above a predetermined level, the voltage developed across said resistance-capacitance charging network being applied to said electronic switch, said switch means being controlled in response to conduction of said third electronic switch to change said starter solenoid to its initial energization state.

9. The invention as defined in claim 8, and means in response to given ambient temperature level for changing said predetermined level of said second control voltage to another level.

10. The invention was defined in claim 8, and a zener diode in series with a resistor, said switch means also connecting said source of energization across said resistor and said zener diode, said zener diode being biased beyond its zener breakdown region, the voltage developed across said zener diode constituting said regulated source.

11. The invention as defined in claim 1, and a zener diode in series with a resistor, said switch means also connecting said source of energization across said resistor and said zener diode, said zener diode being back biased beyond its zener breakdown region, the voltage developed across said zener diode constituting a regulated source, said first, second, and third means being operatively biased by said regulated source.

12. The invention as defined in claim 11 wherein said second control voltage is generated in response to a predetermined lapse of time measured from the establishing of said connection across said zener diode and said resistor.

13. The invention as defined in claim 11, and a first electronic switch connected across said regulated source, said electronic switch being normally biased for non-conduction in the absence of an applied voltage below a predetermined level;

a resistance-capacitance charging network connected in charging relationship across said regulated source, the voltage developed across said network being applied to said electronic switch, said electronic switch being rendered conductive when the voltage developed across said resistance-capacitance network exceeds said predetermined level, and wherein said switch means is controlled in response to conduction of said first electronic switch to change the energization state of said ignition unit and said starting fuel solenoid to its initial energization state;

a second electronic switch;

the windings of a relay and said electronic switch connected in series across said regulated source, said second electronic switch being biased for non-conduction in the absence of applied voltage above a predetermined level, said relay being operatively coupled to a single pole, double-throw switch for selectively connecting a contact to said regulated source, said single pole, double-throw switch initially being out of engagement with said contact, current from said first electronic switch being applied to said second electronic switch, whereby said second electronic switch conducts and said relay is energized to move said switch into engagement with said contact, said switch means being controlled in response thereto for changing the energization state of said main fuel solenoid;

a resistance-capacitance charging network connected across said regulated source through said contact and said single pole, double-throw switch; and a third electronic switch connected across said regulated source, said electronic switch being normally biased for non-conduction in the absence of an applied voltage above a predetermined level, the voltage developed across said resistance-capacitance charging network being applied to said electronic switch, said switch means being controlled in response to conduction of said third electronic switch to change said starter solenoid to its initial energization state.

14. The invention as defined in claim 11 wherein said second engine parameter is an under-voltage condition across said regulated source;

a unijunction transistor having base one, base two, and emitting electrodes, said base one and base two electrodes being connected across said regulated source;

a second zener diode in series with a resistor connected across said regulated source, the voltage developed across said second zener diode being applied to said emitting electrode, said unijunction transistor being biased for non-conduction except when the voltage across said base electrodes falls below a given level; and wherein said switch means is controlled in response to conduction of said unijunction transistor to change the energization state of said ignition unit and said starting fuel solenoid to its initial energization state;

a first electronic switch;

the windings of a relay and said first electronic switch connected in series across said regulated source, said first electronic switch being biased for non-conduction in the absence of an applied voltage above a predetermined level, said relay being operatively coupled to a single pole, double-throw switch for selectively connecting a contact to said regulated source, said single pole, double-throw switch initially being out of engagement with said contact, current from said unijunction transistor being applied to said first electronic switch whereby said first electronic switch conducts and said relay is energized to move said switch into engagement with said contact, said switch means being controlled in response thereto for changing the energization state of said main fuel solenoid;

a resistance-capacitance charging network connected across said regulated source through said contact and said single pole, double-throw switch; and a second electronic switch connected across said regulated source, said second electronic switch being normally biased for non-conduction in the absence of an applied voltage above a predetermined level, the voltage developed across said resistance-capacitance charging network being applied to said second electronic switch, said switch means being controlled in response to conduction of said second electronic switch to change said starter solenoid to its initial energization state.

15. In a system for automatically controlling the starting of a gas turbine engine, said system having a plurality of accessories including a starter solenoid for controlling the energization of a starter motor for rotating the compressor shaft of the engine, a starting fuel solenoid actuated valve for controlling the flow of starting fuel into a combustion chamber, an ignition system for igniting said fuel in said combustion chamber, and a main fuel solenoid actvated valve for controlling the flow of main fuel into said combustion chamber, a source of energization for said accessories, a zener diode in series with a resistor connected across a direct voltage supply, the voltage across said zener diode constituting a regulated source for said accessories, each of said accessories being in an initial energization state wherein said starter motor and ignition unit are de-energized and said valves are closed, the combination comprising:

means responsive to a first engine parameter for generating a first control voltage;

a first initially open relay-operated switch connecting said regulated source across said starter solenoid;

a second initially open relay-operated switch in series with a third initially open relay-operated switch connecting said starting fuel solenoid and said ignition unit across said regulated source;

a fourth initially closed relay-operated switch connecting said main fuel solenoid across said source;

a normally open manual starter switch in series with said supply, said resistor and said zener diode;

a latching type starter relay having first and second oppositely acting windings, said first winding, when energized, serving to simultaneously close said first and second switches, said second winding, when energized, serving to open said first and second switches;

a latching type main fuel relay having third and fourth oppositely acting windings, said third winding, when energized, serving to open said fourth switch, and said fourth winding, when energized, serving to close said fourth switch;

a latching type ignition relay having fifth and sixth oppositely acting windings, said fifth winding, when energized, serving to close said third switch, said sixth winding, when energized, serving to open said third switch, said first, third, and fifth windings being connected in parallel across said source through said starting switch;

whereby the closing of said starting switch results in the energizing of said first, third, and fifth windings to close said first, second, and third switches and open said fourth switch, and whereby said starting fuel solenoid, said ignition unit, and said starter solenoid are energized, and said main fuel solenoid is de-energized;

first electronic means responsive to a first engine parameter above a given level representing a successful engine start for generating first and second voltages, said first electronic means being operatively biased by said regulated source, said first and second voltages being applied sequentially to said sixth winding and said second winding; and second electronic means responsive to a second engine parameter above a given level representing an abnormal engine condition for generating third, fourth, and fifth voltages, said second electronic means being operatively biased by said regulated source, said third, fourth, and fifth voltages being applied in sequence to said sixth winding, said fourth winding and said second winding.

16. The invention as defined in claim 15 wherein said levels are automatically varied in response to ambient temperature.

17. The invention as defined in claim 16 wherein said first control voltage is generated by means of a tachometer generator coupled to said compressor shaft, said tachometer generator developing an output voltage having a frequency proportional to the speed of said shaft; and wherein said first electronic means comprises:

(a) means for converting said output voltage to a constant amplitude square wave having a width proportional to frequency;

(b) first and second electronic switches connected across said regulated source, each of said electronic switches being biased non-conductive in the absence of applied voltages below pre-determined levels;

(c) a first resistance-capacitance charging network;

(d) means coupling said square wave to said first resistance-capacitance charging network, the voltage charge developed across said first resistance capacitance network being applied to said first electronic switch, said first electronic switch being rendered conductive when the charge across said first resistance-capacitance charging network exceeds one predetermined level;

(e) a second resistance-capacitance charging network;

(f) means coupling said square wave to said second resistance-capacitance charging network, the voltage charge developed across said second resistance-capacitance network being applied to said second electronic switch, said second electronic switch being rendered conductive when the charge across said second resistance-capacitance network exceeds a second predetermined level; and wherein said switch means is controlled by conduction of said first electronic switch to change the energization state of said ignition unit and said starting fuel solenoid to their respective initial energization states;

and wherein said switch means is controlled by conduction of said second electronic switch to change said starter solenoid, said ignition unit, and said starting fuel solenoid to their respective initial energization states.

18. The invention as defined in claim 17, and means in response to a given ambient temperature for disabling said first resistance-capacitance network.

19. The invention as defined in claim 17 wherein said means responsive to a second engine parameter for generating a second control voltage is a thermopile, the voltage developed by said thermocouple being proportional to the exhaust gas temperature of said engine, said means responsive to said control voltage above a predetermined level including:

a magnetic switch connected across said source, said magnetic switch being normally biased for non-conduction in the absence of an applied voltage above said predetermined level, said second control voltage being applied to said electronic switch, and wherein said switch means is controlled in response to conduction of said magnetic switch to change the energization state of said ignition unit and said starting fuel solenoid to its initial energization state;

a first electronic switch;

the windings of a relay and said first electronic switch connected in series across said regulated source, said first electronic switch being biased for non-conduction in the absence of an applied voltage above said predetermined level, said relay being operatively coupled to a single pole, double-throw switch for selectively connecting a contact to said regulated source, said single pole, double-throw switch initially being out of engagement with said contact, said second control voltage being applied to said first electronic switch, conduction of said first electronic switch, when said second control voltage exceeds said level, energizing said relay to move said switch into engagement with said contact, said switch means being controlled in response thereto for changing the energization state of said main fuel solenoid;

a resistance-capacitance charging network connected across said source through said contact and said single pole, double-throw switch; and a second electronic switch connected across said source, said second electronic switch being normally biased for non-conduction in the absence of an applied voltage above a predetermined level, the voltage developed across said resistance-capacitance charging network being applied to said second electronic switch, said switch means being controlled in response to conduction of said second electronic switch to change said starter solenoid to its initial energization state.

20. The invention as defined in claim 17, and a first electronic switch connected across said regulated source, said electronic switch being normally biased for non-conduction in the absence of an applied voltage below a predetermined level;
   a resistance-capacitance charging network connected in charging relationship across said regulated source, the voltage developed across said network being applied to said electronic switch, said electronic switch being rendered conductive when the voltage developed across said resistance-capacitance network exceeds said predetermined level, and wherein said switch means is controlled in response to conduction of said first electronic switch to change the energization state of said ignition unit and said starting fuel solenoid to its initial energization state;
   a second electronic switch;
   the windings of a relay and said electronic switch connected in series across said regulated source, said second electronic switch being biased for non-conduction in the absence of applied voltage above a predetermined level, said relay being operatively coupled to a single pole, double-throw switch for selectively connecting a contact to said regulated source, said single pole, double-throw switch initially being out of engagement with said contact, current from said first electronic switch being applied to said second electronic switch, whereby said second electronic switch conducts and said relay is energized to move said switch into engagement with said contact, said switch means being controlled in response thereto for changing the energization state of said main fuel solenoid;
   a resistance-capacitance charging network connected across said regulated source through said contact and said single pole, double-throw switch; and
   a third electronic switch connected across said regulated source, said electronic switch being normally biased for non-conduction in the absence of an applied voltage above a predetermined level, the voltage developed across said resistance-capacitance charging network being applied to said electronic switch, said switch means being controlled in response to conduction of said third electronic switch to change said starter solenoid to its initial energization state.

21. The invention as defined in claim 17 wherein said second engine parameter is an under-voltage condition across said regulated source;
   a first electronic switch connected across said regulated source, said electronic switch being biased for non-conduction except in the absence of an applied voltage greater than a given level;
   a second zener diode in series with a resistor connected across said regulated source, the voltage developed across said second zener diode being applied to said first electronic switch, said first electronic switch conducting when the voltage across said second zener diode falls below the zener breakdown region of said second zener diode, and wherein said switch means is controlled in response to conduction of said first electronic switch to change the energization state of said ignition unit and said starting fuel solenoid to its initial energization state;
   a second electronic switch;
   the windings of a relay and said second electronic switch connected in series across said regulated source, said second electronic switch being biased for non-conduction in the absence of an applied voltage above a predetermined level, said relay being operatively coupled to a single pole, double-throw switch for selectively connecting a contact to said regulated source, said single pole, double-throw switch initially being out of engagement with said contact, current from said first electronic switch being applied to said second electronic switch whereby said second electronic switch conducts and said relay is energized to move said switch into engagement with said contact, said switch means being controlled in response thereto for changing the energization state of said main fuel solenoid;
   a resistance-capacitance charging network connected across said regulated source through said contact and said single pole, double-throw switch; and
   a third electronic switch connected across said regulated source, said electronic switch being normally biased for non-conduction in the absence of an applied voltage above a predetedmined level, the voltage developed across said resistance-capacitance charging network being applied to said electronic switch, said switch means being controlled in response to conduction of said third electronic switch to change said starter solenoid to its initial energization state.

References Cited by the Examiner
UNITED STATES PATENTS
2,866,385  12/1958  Miller _____ 60—39.14 X JULIUS E. WEST, *Primary Examiner*.

UNITED STATES PATENT OFFICE
CERTIFICATE OF CORRECTION

Patent No. 3,310,937                                                    March 28, 1967

Emile G. Smith

It is hereby certified that error appears in the above numbered patent requiring correction and that the said Letters Patent should read as corrected below.

Column 3, line 65, for "25 is" read -- 25 --; line 67, for "started" read -- starter --; column 4, line 9, for "or" read -- of --; line 15, before "windings" insert -- relay --; column 6, line 70, for "circuitary" read -- circuitry --; column 7, line 3, for "absorbed" read -- aborted --; line 33, for "electrode" read -- electrodes --; column 8, line 14, for "252" read -- 242 --; column 9, line 37, for "218" read -- 258 --; column 11, line 52, after "states," insert -- whereby said engine is in self-sustaining operation; --; column 12, line 5, for "compression" read -- compressor --; column 13, line 3, for "A" read -- a --; line 36, for "was" read -- as --; line 39, for "being biased" read -- being back biased --; column 15, line 4, for "actvated" read -- actuated --.

Signed and sealed this 7th day of November 1967.

(SEAL)
Attest:

EDWARD M. FLETCHER, JR.                                EDWARD J. BRENNER
Attesting Officer                                                Commissioner of Patents